J. A. VIELE.
MOTOR CAR TRANSMISSION GEARING.
APPLICATION FILED OCT. 6, 1911.
1,050,500. Patented Jan. 14, 1913.
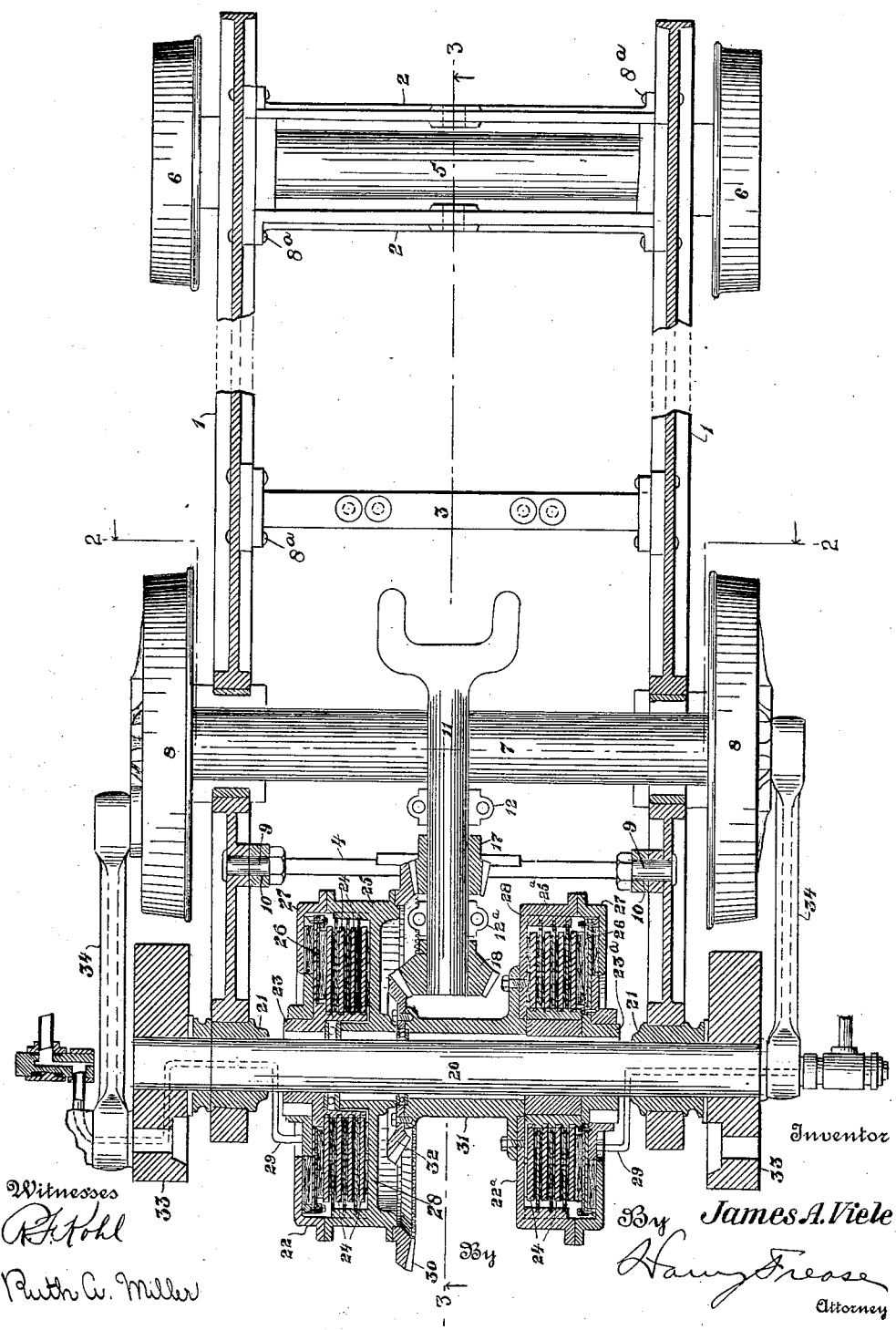

UNITED STATES PATENT OFFICE.

JAMES A. VIELE, OF WARREN, PENNSYLVANIA.

MOTOR-CAR TRANSMISSION-GEARING.

1,050,500.   Specification of Letters Patent.   Patented Jan. 14, 1913.

Application filed October 6, 1911. Serial No. 653,134.

*To all whom it may concern:*

Be it known that I, JAMES A. VIELE, a citizen of the United States, residing at Warren, in the county of Warren and State of Pennsylvania, have invented certain new and useful Improvements in Motor-Car Transmission-Gearing, of which the following is a specification.

The invention relates to the transmission gearing of a motor car, wherein the power is produced by an internal combustion engine or other form of motor, and is transmitted by the gearing to the drive wheels of the vehicle; and the object of the improvement is to provide a gearing of this character for use in heavy cars built for use on railroads wherein the ponderous weight of the car, the rigidity of the track and roadbed, and the loads, shocks and vibrations imposed upon the gearing, subject the same to unusual strains both in kind and degree.

The invention furthermore pertains to the adaptation of pneumatic friction clutches in gearings of this character whereby the work of starting, propelling and stopping the car can be taken up, and the speed thereof varied, in a gradual manner without unduly shocking or straining the gearing or jolting the car.

The general objects of the invention, thus set forth in general terms, are attained by the mechanism, construction and arrangement illustrated in the accompanying drawing, forming part hereof, in which the figure is a plan view, partly in section, of a motor truck frame showing the improved form of gearing.

Similar numerals refer to similar parts throughout the drawing.

The frame of the motor truck is composed of the side girders 1 and the connecting cross girders 2, 2, 3 and 4: the cross girders 2, 2, being the forward girders, are located one on each side of the axle 5 of the pilot wheels 6; the cross girder 3, being the main cross girder, is located just forward of the axle 7 of the drive wheels 8; and the cross girder 4 is located just in rear of the drive wheel axle. The ends of the forward and main cross-girders are rigidly secured to the side girders by suitable bolts or rivets 8$^a$ as shown, and the ends of the rear cross-girder 4 are secured to the side girder by the transverse bolts 9.

The longitudinal main-shaft extension 11 of the motor (not shown) constitutes the driving shaft of the gearing, and is journaled in the bearings 12 and 12$^a$, which are formed or secured on the upper side of the rear cross girder 4. The bevel pinion 17 for low speed is secured to the driving shaft 11, preferably between the bearings 12 and 12$^a$, so as to sustain the starting strains on this pinion by both bearings; while the bevel pinion 18 for high speed is secured to the free end of the driving shaft in rear of the bearing 12$^a$.

The transverse countershaft 20 is located adjacent to the free rear end of the driving shaft and in the same horizontal plane therewith, and is journaled in suitable bearings 21 carried by the side girders 1 of the truck frame. Two multiple-disk clutches 22 and 22$^a$ are mounted on the countershaft, one on each side of the line of the driving shaft 11. Each clutch is composed of a driving member 23 or 23$^a$ keyed to the countershaft and having a series of driving disk rings 24 feathered by their inner edges thereon, and a driven member 25 or 25$^a$ journaled on the countershaft and shaped as a cylindric case and having a series of intervening driven disk rings feathered therein by their peripheral edges, there being an inflatable diaphragm 26 feathered on the driving member between one head 27 of the driven member and the adjacent driving disk ring, whereby all the disk rings may be clamped together and against the other head 28 of the driven member, as by compressed air applied through the tubular duct 29 and controlled by a valve, not shown; which particular form of multiple-disk clutch is not claimed herein but is more fully set forth and claimed in a separate application filed October 6, 1911, Serial No. 653,136 which is referred to for a particular description of its details.

On the cylindric case 25 of one driven clutch member is formed or secured the bevel gear wheel 30 which meshes with the beveled pinion 17 on the driving shaft, for low speed; and on the cylindric case of the other driven clutch member is formed or secured the extension sleeve 31 which is journaled on and extends along the countershaft across and beyond the end of the driving shaft and has formed or secured on its end the bevel gear wheel 32 of less diameter than the other gear wheel, which meshes with the bevel pinion 18 on the driving shaft, for high speed; the two gear wheels being thus located and meshing with the corresponding pinions on the same side of the driving shaft, so that both wheels will be rotated thereby in the same direction.

By this construction and arrangemt, it is evident that, when the driving shaft is rotated, and the clutch-disks are not clamped together, the driven members of both clutches will rotate freely on the countershaft at different speeds according to the relative diameters of the gear wheels, but that when the clutch-disks of either one or the other are clamped together, as by compressed air introduced through the corresponding supply duct 29, this clutch will rotate the countershaft according to the speed of its gear wheel, which rotation is communicated to the drive wheels of the car truck by means of the crank-disks 33 which are formed or secured on the ends of the countershaft, and the connecting rods 34 extending between these crank-disks and the drive wheels.

I claim:

1. A transmission gearing for a motor car, including a longitudinal driving shaft, two bevel pinions thereon, a transverse countershaft adjacent to the end of the driving shaft, two clutches on the countershaft on opposite sides of the driving shaft with bevel gear wheels thereon in mesh with the respective pinions on the same side of the driving shaft.

2. A transmission gearing for a motor car, including a longitudinal driving shaft, two bevel pinions thereon, a transverse countershaft adjacent to the end of the driving shaft, two clutches on the countershaft on opposite sides of the driving shaft with bevel gear wheels of different diameters thereon in mesh with the respective pinions on the same side of the driving shaft.

3. A transmission gearing for a motor car, including a longitudinal driving shaft, two bevel pinions thereon, a transverse countershaft adjacent to the end of the driving shaft, two clutches on the countershaft, on opposite sides of the driving shaft with bevel gear wheels thereon in mesh with the respective pinions on the same side of the driving shaft, with means for clamping the clutches, one at a time, to the countershaft.

4. A transmission gearing for a motor car, including a longitudinal driving shaft, two bevel pinions thereon, a transverse countershaft adjacent to the end of the driving shaft, a clutch on the countershaft on one side of the driving shaft with a bevel gear wheel thereon in mesh with one of the pinions, a second clutch on the countershaft on the other side of the driving shaft, and a sleeve on the second clutch extending along the countershaft across and beyond the end of the driving shaft with a bevel gear wheel thereon in mesh with the other pinion on the same side of the driving shaft as the other gear wheel.

5. A transmission gearing for a motor car, including a longitudinal driving shaft, two bevel pinions thereon, a transverse countershaft adjacent to the end of the driving shaft, a clutch on the countershaft on one side of the driving shaft with a bevel gear wheel thereon in mesh with one of the pinions, a second clutch on the countershaft on the other side of the driving shaft, and a sleeve on the second clutch extending along the countershaft across and beyond the end of the driving shaft with a bevel gear wheel thereon in mesh with the other pinion on the same side of the driving shaft as the other gear wheel, and being of less diameter than the other gear wheel.

6. A transmission gearing for a motor car, including a longitudinal driving shaft, two bevel pinions thereon, a transverse countershaft adjacent to the end of the driving shaft, a clutch on the countershaft on one side of the driving shaft with a bevel gear wheel thereon in mesh with one of the pinions, a second clutch on the countershaft on the other side of the driving shaft, and a sleeve on the second clutch extending along the countershaft across and beyond the end of the driving shaft with a bevel gear wheel thereon in mesh with the other pinion on the same side of the driving shaft as the other gear wheel, with means for clamping the clutches, one at a time, to the countershaft.

JAMES A. VIELE.

Witnesses:
FRANK M. KNAPP,
RALPH N. BROWN.